P. J. ERNENWEIN.
RUBBER TIRE.
APPLICATION FILED NOV. 8, 1919.

1,360,907. Patented Nov. 30, 1920.

INVENTOR
Philip J. Ernenwein
BY
Chas. W. Stapleton
ATTORNEY

UNITED STATES PATENT OFFICE.

PHILIP J. ERNENWEIN, OF NEW YORK, N. Y.

RUBBER TIRE.

1,360,907.  Specification of Letters Patent.  Patented Nov. 30, 1920.

Application filed November 8, 1919. Serial No. 336,541.

*To all whom it may concern:*

Be it known that I, PHILIP J. ERNENWEIN, a citizen of the United States, residing at 306 West 47th street, borough of Manhattan, city of New York, N. Y., have invented an Improvement in Rubber Tires, of which the following is a specification.

My invention relates more particularly to the type of tires known as solid rubber tires of large sizes, such as are used on trucks and other similar vehicles for carrying heavy loads. Many tires of this type have recesses or openings in the outer surface to relieve the strain in the rubber resulting from the wave movement inherent in tires of this type when in use, and also for traction purposes, and many different forms of openings, pockets and recesses are in use with such tires under various arrangements as to location. I have found however that better results are obtained when the mass of rubber in the tire stands in proper relation to the size and location of the openings, as these features and also the shape of the openings materially effect the wearing quality of the tire; best results will obtain where openings are provided of proper shape, size and location so that all parts of the rubber may have a chance to expand when under pressure of the load, as nearly equal as possible.

To accomplish this I provide a tire with unconnected, transverse side and central openings, also a longitudinal central opening, the width of the latter should vary with the height of the tire, and also the size of the openings or pockets will be in proportion to the widths and height of the rubber portion of the tire the prime object being to use the largest mass of rubber possible leaving sufficient space for expansion of all parts when under pressure; in the small sizes of tires this longitudinal opening may be very narrow. In a twelve inch tire of medium height, the central opening should be from ¼ to ½ of an inch in width and the transverse pockets about 1 inch in width spaced about 3½ to 4 inches apart from center to center. All these openings must have considerable depth that the central portions of the rubber may have space for expansion.

Figure 1:
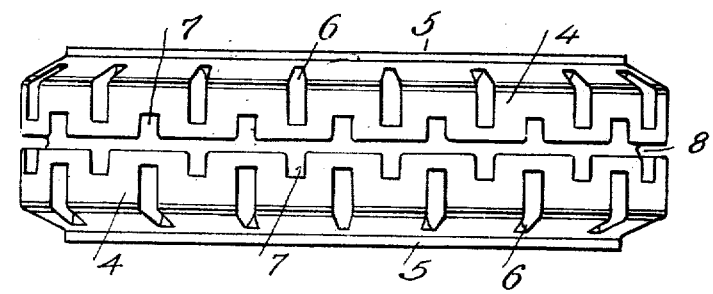
Figure 2:
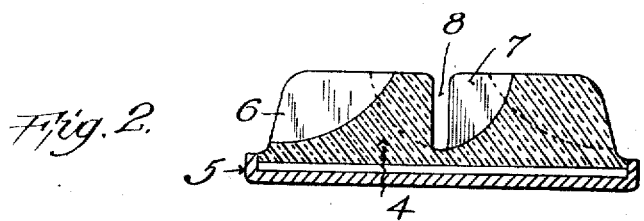
Figure 3:
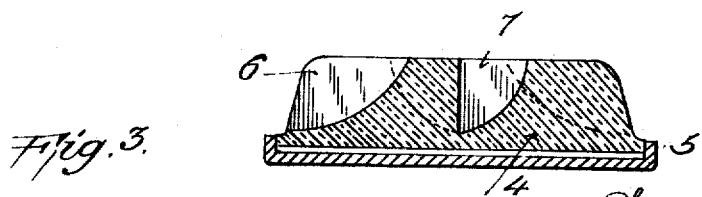

In the annexed drawings Figure 1, is a top plan view of a fragment of a tire embodying my invention. Fig. 2, is a view of such tire in cross section. Fig. 3, is a modification of Fig. 2, the longitudinal opening being omitted. Like numerals refer to like parts in all figures.

The rubber portion of the tire 4, is secured to a metal base rim 5, by any of the well known means now in common use. This metal base rim in turn is secured to the felly of the wheel. In the rubber portions are transverse side openings 6—6, and transverse central pockets or openings 7—7 and a longitudinal opening 8 which extends entirely around the tire.

In the smaller and shallower tires the central opening may be of comparatively small width, or in very small or shallow tires may be really omitted as shown in Fig. 3, leaving the pockets or openings to take care of the expansion of the rubber.

Having described my invention, I claim—

In a rubber tire of the character described, a metal base rim, a continuous rubber band vulcanized to said base rim, said band having a central open channel relatively deep extending circumferentially entirely around said band and dividing the tread portion thereof into counterparts, each counterpart having on its exterior edge a plurality of relatively deep recesses extending from the exterior walls transversely to points in the tread portions of said counterparts short of said central channel, said counterparts also having on their interior edges a plurality of relatively deep notches extending from said central channel transversely to points in the tread portions of said counterparts short of the exterior walls thereof.

PHILIP J. ERNENWEIN.